3,660,292
FERRITE MATERIALS
Clement Bryce, Southport, England, assignor to
U.S. Philips Corporation
No Drawing. Filed Sept. 17, 1970, Ser. No. 73,216
Claims priority, application Great Britain, Sept. 18, 1969,
46,049/69
Int. Cl. C04b 35/26, 35/36
U.S. Cl. 252—62.6                            1 Claim

ABSTRACT OF THE DISCLOSURE

High resistivity manganese-zinc-magnesium-copper ferrites for yoke ring applications. These ferrites have a composition expressed in mol. percent within the following ranges:

| | |
|---|---|
| $Fe_2O_3$ | 33–39 |
| MnO | 20–32 |
| ZnO | 14–22 |
| MgO | 12–22 |
| CuO | 0.5–15 |

This invention relates to manganese-zinc-magnesium-copper ferrite materials.

The most widely used material for making magnetic cores (hereafter termed "yoke rings") on which the deflection coils of television receivers are wound, has been a manganese-zinc ferrite having a resistivity of approximately $10^2$ ohm-cms. A disadvantage of this material is that current leakage may occur via the ferrite core if the insulation on the winding is damaged during assembly, or by sharp edges on the yoke ring. Nickel-zinc ferrites having resistivities at room temperature of at least $10^6$ ohm-cms., have been used for making yoke rings, but these nickel-zinc ferrites are expensive for this application.

The present invention provides a manganese-zinc-magnesium-copper ferrite which is formed by sintering a mixture of oxidic or oxide-forming constituents at a temperature in the range from 1190° C. to 1350° C., wherein the composition of the mixture expressed in mol. percent of the oxides is within the following ranges:

| | |
|---|---|
| $Fe_2O_3$ | 33–39 |
| MnO | 20–32 |
| ZnO | 14–22 |
| MgO | 12–22 |
| CuO | 0.5–15 | wherein the molar ratio $Fe_2O_3$:ZnO is at least 1.9:1, and the manganese-containing ingredient of the mixture is $MnO_2$.

When a material is required having a resistivity at room temperature of at least $10^7$ ohm-cms., the $Fe_2O_3$ content of the mixture is preferably within the range from 33 to 40 mol. percent.

Preferably the composition of the mixture is within the following ranges:

| | |
|---|---|
| $Fe_2O_3$ | 36–45 |
| MnO | 20–28 |
| ZnO | 17–22 |
| MgO | 12–19 |
| CuO | 0.5–10 |

During the investigations which led to the present invention, additions of CuO were used with Mn-Zn-Mg-ferrite compositions in order to depress the sintering temperatures from the values necessary to obtain ferrites having desired values of initial permeability. In order to further depress the sintering temperature the manganese compound used in the starting mixture was manganese dioxide, although any oxide or oxide-forming compound of manganese may be used to make a ferrite according to the present invention.

Ferrite materials having a rectangular hysteresis loop are considered to be materials in which the quotient $B_R/B_S$ is at least 0.8. The quotient $B_R/B_S$ of materials according to the present invention was found to be approximately 0.7 at room temperature.

Some embodiments of the present invention will now be described with reference to the following examples and to the table.

EXAMPLES

Mixtures of $Fe_2O_3$, $MnO_2$, ZnO, MgO and CuO in the proportions specified in the table, were milled with water for 4 hours in a ball mill. The resulting slurry was dried by evaporation. The dried material was pressed into blocks and prefired in air at approximately 1050° C. The prefired blocks were then crushed and milled with water in a ball mill for 15 hours. The resulting slurry was dried by evaporation and granules were formed from the dried material. These granules were pressed into 36 mm. diameter toroids which were subsequently sintered in air. Table I defines the compositions and sintering temperatures used to prepare a number of toroids. The resistivities at 20° C. and 85° C., together with some of the magnetic characteristics of the resulting toroids are given in Table II.

TABLE I

| No. | Composition (mol. percent) | | | | | Mole. ratio $Fe_2O_3$/ZnO | Sintering temp.(° C.) |
|---|---|---|---|---|---|---|---|
| | $Fe_2O_3$ | $MnO_2$ | ZnO | MgO | CuO | | |
| 1 | 45 | 23 | 17 | 14 | 1 | 2.65 | 1,200 |
| 2 | 45 | 23 | 15 | 16 | 1 | 3 | 1,200 |
| 3 | 43 | 22 | 19.5 | 14.5 | 1 | 2.21 | 1,235 |
| 4 | 41 | 23.5 | 18.5 | 16 | 1 | 2.22 | 1,235 |
| 5 | 39 | 25.5 | 17.5 | 17 | 1 | 2.23 | 1,235 |
| 6 | 37 | 27 | 16.5 | 18.5 | 1 | 2.24 | 1,235 |
| 7 | 35 | 28.5 | 16 | 19.5 | 1 | 2.19 | 1,235 |
| 8 | 37 | 24 | 17 | 20 | 2 | 2.18 | 1,235 |
| 9 | 37 | 26 | 17 | 18 | 2 | 2.18 | 1,235 |
| 10 | 37 | 26 | 15 | 20 | 2 | 2.47 | 1,235 |
| 11 | 37 | 28 | 15 | 18 | 2 | 2.47 | 1,235 |
| 12 | 39 | 26 | 17 | 16 | 2 | 2.3 | 1,235 |
| 13 | 39 | 24 | 17 | 18 | 2 | 2.3 | 1,250 |
| 14 | 39 | 27 | 15 | 17 | 2 | 2.6 | 1,235 |
| 15 | 39 | 25 | 15 | 19 | 2 | 2.6 | 1,235 |
| 16 | 39 | 25 | 17.5 | 16.5 | 2 | 2.22 | 1,235 |
| 17 | 39 | 24.5 | 17.5 | 16 | 3 | 2.22 | 1,235 |
| 18 | 39 | 24 | 17.5 | 15.5 | 4 | 2.22 | 1,235 |
| 19 | 39 | 23 | 17.5 | 15.5 | 5 | 2.22 | 1,235 |
| 20 | 39 | 22.5 | 17.5 | 15 | 6 | 2.22 | 1,235 |
| 21 | 39 | 22 | 17.5 | 14.5 | 7 | 2.22 | 1,235 |
| 22 | 39 | 21.5 | 17.5 | 14 | 8 | 2.22 | 1,235 |
| 23 | 39 | 25 | 17.5 | 16.5 | 2 | 2.22 | 1,310 |
| 24 | 39 | 24.5 | 17.5 | 16 | 3 | 2.22 | 1,310 |
| 25 | 39 | 24 | 17.5 | 15.5 | 4 | 2.22 | 1,310 |
| 26 | 39 | 23 | 17.5 | 15.5 | 5 | 2.22 | 1,310 |
| 27 | 39 | 22.5 | 17.5 | 15 | 6 | 2.22 | 1,310 |
| 28 | 39 | 22 | 17.5 | 14.5 | 7 | 2.22 | 1,310 |
| 29 | 39 | 21.5 | 17.5 | 14 | 8 | 2.22 | 1,310 |

TABLE II

| No. | ×10³ ohm-cm. at— 20° C. | ×10³ ohm-cm. at— 85° C. | μ at— 20° C. | μ at— 85° C. | Loss (m.w./cc.) 16 kHz. 100 M.T. | Curie tempi (° C.) |
|---|---|---|---|---|---|---|
| 1 | 2.54 | 1.61 | 400 | 570 | 168 | 182 |
| 2 | 3.02 | 2.01 | 320 | 440 | 218 | 204 |
| 3 | 4.74 | | 639 | 1,253 | 100 | 156 |
| 4 | 9.46 | | 629 | 1,375 | 101 | 144 |
| 5 | 30.1 | | 551 | 1,199 | 112 | 140 |
| 6 | 138.1 | 51.5 | 335 | 486 | 199 | 136 |
| 7 | 150.6 | 44.1 | 327 | 481 | 232 | 138 |
| 8 | 82.8 | 26 | 400 | 670 | 194 | 135 |
| 9 | 66 | 26 | 450 | 780 | 165 | 142 |
| 10 | 83 | 25.6 | 320 | 530 | 204 | 152 |
| 11 | 48 | 13 | 460 | 650 | 143 | 155 |
| 12 | 23 | 7.2 | 490 | 1,020 | 131 | 153 |
| 13 | 82.7 | 30.8 | 415 | 950 | 144 | 161 |
| 14 | 12.1 | 4.3 | 400 | 760 | 202 | 164 |
| 15 | 41.4 | 13.2 | 360 | 680 | 221 | 166 |
| 16 | 25.9 | 9.5 | 491 | 1,059 | 134 | 150 |
| 17 | 26.7 | 9.0 | 476 | 1,062 | | 156 |
| 18 | 31.9 | 9.9 | 462 | 1,049 | 155 | 160 |
| 19 | 28.6 | 9.5 | 635 | 975 | 173 | 162 |
| 20 | 24 | 9.9 | 424 | 970 | 183 | 160 |
| 21 | 25.9 | 12.1 | 407 | 900 | 189 | 162 |
| 22 | 23 | 9.9 | 389 | 888 | 206 | 164 |
| 23 | 32 | 9.7 | 482 | 1,046 | 139 | 143 |
| 24 | 28 | 10.8 | 435 | 1,023 | 141 | 138 |
| 25 | 29 | 11.3 | 409 | 994 | 154 | 144 |
| 26 | 23 | 12.0 | 414 | 986 | 188 | 147 |
| 27 | 32 | 10.9 | 373 | 928 | 206 | 153 |
| 28 | 34 | 11.2 | 370 | 889 | 227 | 151 |
| 29 | 5.2 | 7.4 | 337 | 890 | 179 | 155 |

What is claimed is:

1. A ferromagnetic body consisting of manganese-zinc-magnesium-copper ferrite which is the sintered reaction product, in mol. percent of the oxides:

$Fe_2O_3$ ---- 36–45
MnO ---- 20–28
ZnO ---- 17–22
MgO ---- 12–19
CuO ---- 0.5–10 the molar ratio $Fe_2O_3$:ZnO being at least 1.9:1.

References Cited

UNITED STATES PATENTS 3,441,506   4/1969   Kitagawa et al. ---- 252—62.6

ROBERT D. EDMONDS, Primary Examiner

U.S. Cl. X.R.

252—62.62, 62.64